United States Patent [19]

Nakahara

[11] Patent Number: 5,473,668
[45] Date of Patent: Dec. 5, 1995

[54] DIGITAL CORDLESS TELEPHONE SYSTEM READILY CAPABLE OF SETTING UP

[75] Inventor: Toru Nakahara, Tokyo, Japan

[73] Assignee: NEC Corporation, Tokyo, Japan

[21] Appl. No.: 278,264

[22] Filed: Jul. 21, 1994

[30] Foreign Application Priority Data

Jul. 21, 1993 [JP] Japan .................................. 5-179582

[51] Int. Cl.⁶ .............................. H04Q 7/20; H04J 3/00
[52] U.S. Cl. .................. 379/58; 379/61; 370/77
[58] Field of Search .................. 379/58, 59, 60, 379/61, 63; 370/77, 91, 95.3, 100.1; 455/33.1, 54.1

[56] References Cited

U.S. PATENT DOCUMENTS

| | | | |
|---|---|---|---|
| 5,060,266 | 10/1991 | Dent | 379/59 X |
| 5,195,091 | 3/1993 | Farwell et al. | 379/60 X |
| 5,323,446 | 7/1994 | Kojima et al. | 379/60 |

*Primary Examiner*—Curtis Kuntz
*Assistant Examiner*—Michael B. Chernoff
*Attorney, Agent, or Firm*—Sughrue, Mion, Zinn, Macpeak & Seas

[57] ABSTRACT

In a digital cordless telephone system including master and slave radio stations that are operable in response to first and second frame synchronization signals synchronized with each other to produce first and second TDMA signals in the form of radio signals, respectively, a timing signal whch is produced on the basis of the first frame synchronization signal by the master radio station is transmitted to the slave radio station through a signal line to synchronize the slave radio station with the master radio station and is received by the slave radio station after lapse of a time delay determined by a length of the signal line. The timing signal is delayed in the master radio station by a single period of the first frame synchronization signal to produce the first TDMA signal synchronized with the delayed timing signal while the timing signal received with the time delay by the slave radio station is timed by the second frame synchronization signal to produce an output synchronization signal synchronized with the second frame synchronization signal and to obtain the second TDMA signal timed by the output synchronization signal. As a result, the first and the second TDMA signals are produced at an instant coincident with each other. The timing signal may be a TDMA frame synchronization signal.

6 Claims, 9 Drawing Sheets

DIGITAL CORDLESS TELEPHONE SYSTEM READILY CAPABLE OF SETTING UP

BACKGROUND OF THE INVENTION

This invention relates to a digital cordless telephone system for connecting mobile telephone terminals or digital cordless telephone sets to a public telephone network.

A conventional digital cordless telephone system of the type described comprises a plurality of radio stations which are classified into a master station and slave station or slave stations. Each slave station is connected to the master station in order to be operated in synchronism with the master station.

Each of the master and the slave stations is connected through an exchange station to the public telephone network and converts a received signal from the exchange station into a TDMA signal which is divided into a sequence of frames and which is transmitted from the radio station. In addition, each of the radio stations has a service area and can communicate with the mobile telephone terminals which are located in the service area. The service area has at least one common area adjacent to service areas in order that the mobile telephone terminals may be able to move from one service area to another in the course of communication.

Herein, it is to be noted that the master station supplies radio frame synchronization signals to the respective slave stations so as to operate the slave stations in synchronism with the master station. The radio frame synchronization signals are received by the slave stations with delay times which are different from one another and which are decided by a distance between the master station and each of the slave stations.

On setting up the conventional digital cordless telephone system, a delay time measuring apparatus should be prepared so as to measure the delay times. Such measurement of the delay times not only brings about an increase of costs but also is laborious and time-consuming.

SUMMARY OF THE INVENTION

It is therefore an object of this invention to provide a digital cordless telephone system which is readily and quickly capable of setting up.

Other objects of this invention will become clear as the description proceeds.

On describing the gist of this invention, it is possible to understand that a digital cordless telephone system comprises a master radio station connected through an exchange station to a public telephone network and a slave radio station connected to both the master radio station and the exchange station. The master radio station converts a first reception signal received from the exchange station into a first TDMA signal which is transmitted from the master radio station in the form of a first radio signal. On the other hand, the slave radio station converts a second reception signal received from the exchange station into a second TDMA signal which is transmitted in the form of a second radio signal from the slave radio station. The first and the second reception signals include first and second frame synchronization signals, respectively, while the first and the second TDMA signals include first and second TDMA frame synchronization signals produced from the first and the second frame synchronization signals, respectively.

According to this invention, the master radio station includes first interface means connected to the exchange station for generating the first frame synchronization signal which is derived from the first reception signal and which has a first frame period, TDMA frame synchronization signal generating means connected to the first interface means for generating the first TDMA frame synchronization signal in response to the first frame synchronization signal, TDMA signal supplying means connected to the TDMA frame synchronization signal generating means for supplying the first TDMA frame synchronization signal to the slave radio station through the transmission line, and delay means connected to the TDMA frame synchronization signal generating means for delaying the first TDMA frame synchronization signal by a delay time which is equal to the first frame period to define a first transmission time instant of the first TDMA signal.

On the other hand, the slave radio station includes second interface means connected to the exchange station for generating the second frame synchronization signal which is derived from the second reception signal and which has a second frame period equal to the first frame period, and transmission timing adjusting means connected to the TDMA signal supplying means through the transmission line and the second interface means for adjusting the second TDMA frame synchronization signal in response to the second frame synchronization signal with reference to the first TDMA frame synchronization signal received through the transmission line to define a second transmission time instant of the second TDMA signal. The second transmission time instant is coincident with the first transmission time instant.

DESCRIPTION OF THE PREFERRED EMBODIMENT

Referring to FIGS. 1 through 6, a conventional digital cordless telephone system will first be described in order to facilitate an understanding of the present invention.

Figure 1:
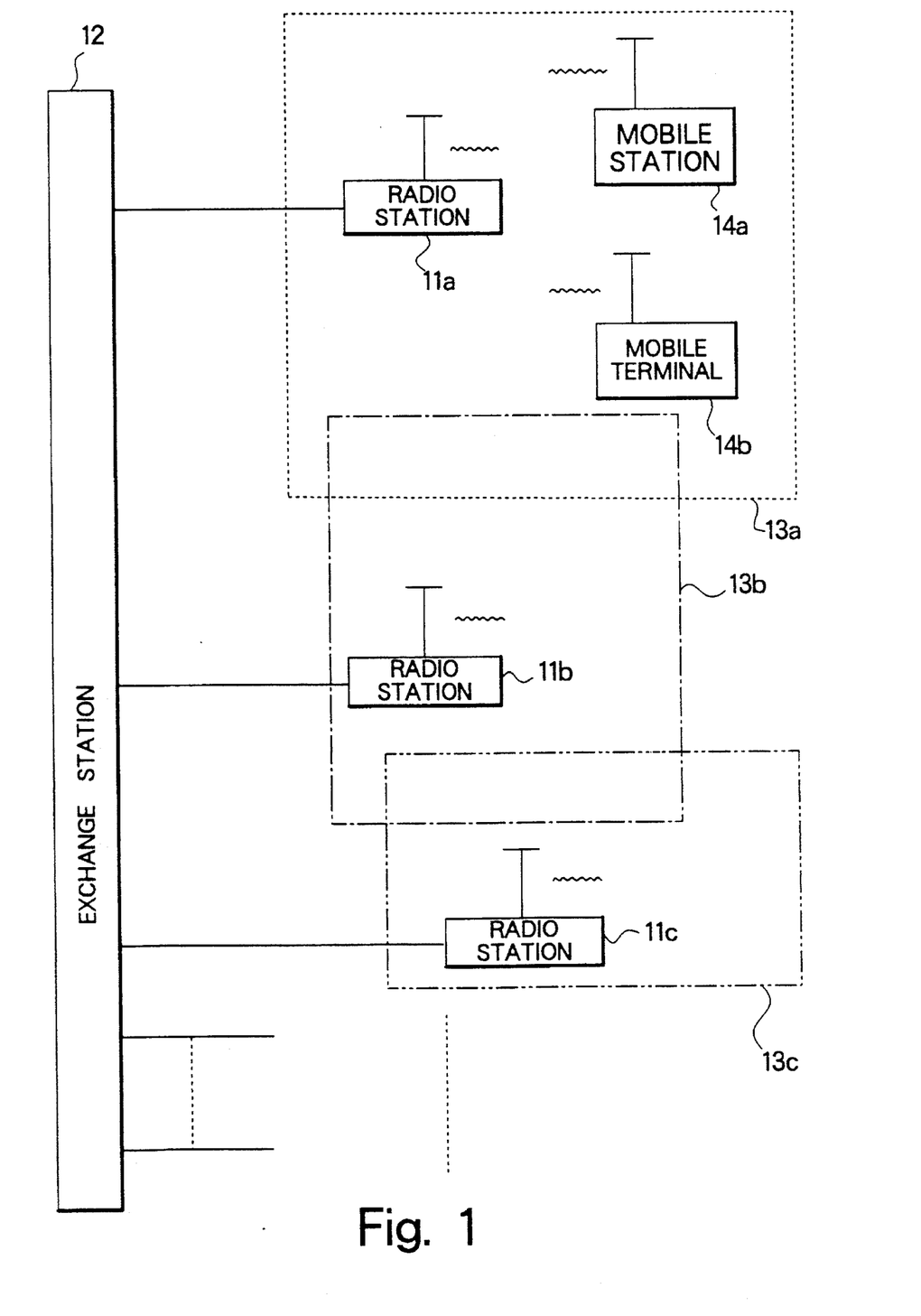
FIG. 1 is a diagrammatic block diagram of a general digital cordless telephone system to which this invention is applicable.

In FIG. 1, a conventional digital cordless telephone system comprises radio stations 11a, 11b, 11c, and etc. which are connected to an exchange station 12 of a public telephone network. Each of the radio stations has a service area. For example, the radio stations 11a, 11b, and 11c have service areas 13a, 13b, and 13c, respectively. The radio stations can communicate with mobile telephone terminals (or digital cordless telephone sets) which are located in the service area, respectively. For example, the radio station 11a can communicate with mobile telephone terminals 14a and 14b because the mobile telephone terminals 14a and 14b are located in the service area 13a.

Figure 2:
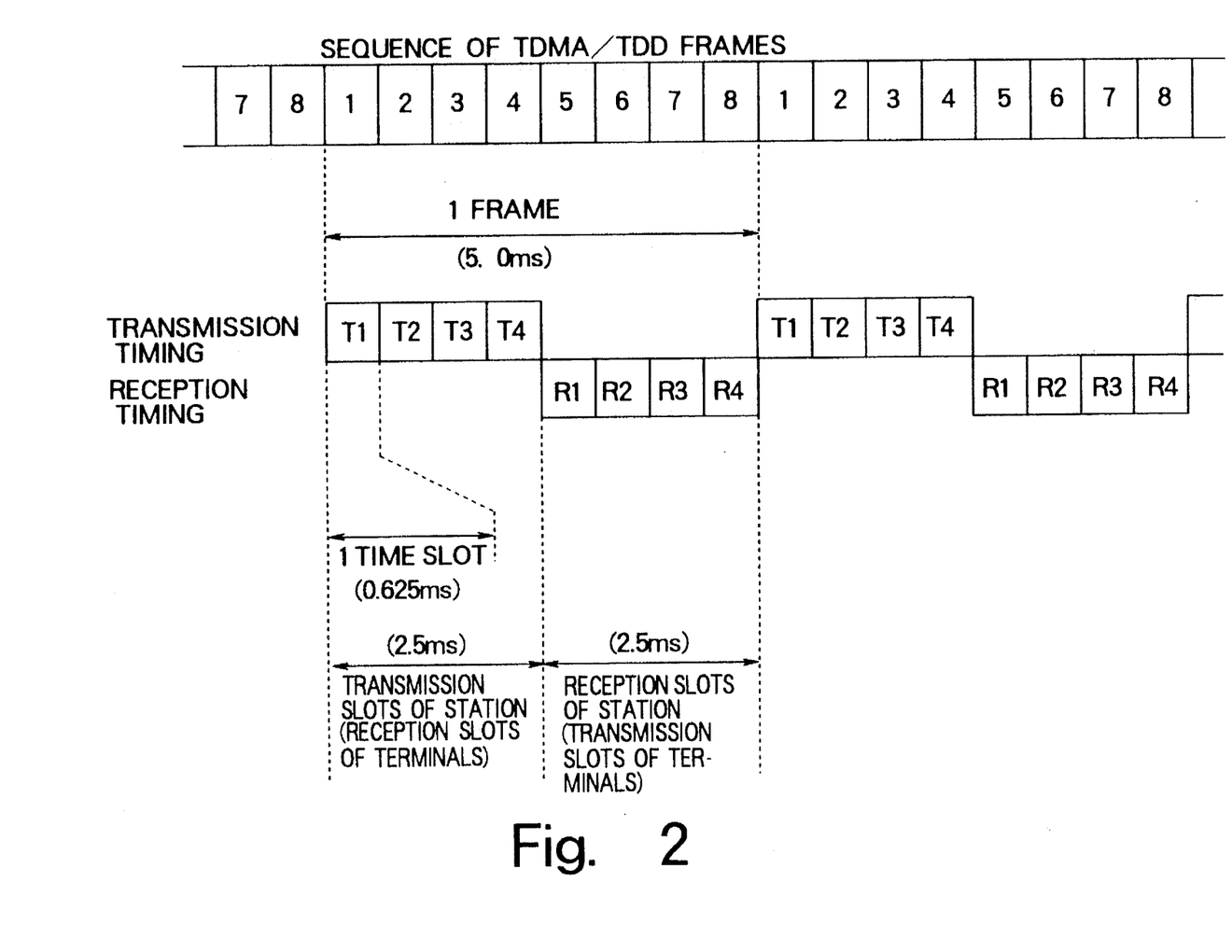
FIG. 2 shows a general signal format which appears in the digital cordless telephone system illustrated in FIG. 1.

In the conventional digital cordless telephone system, transmission and reception are carried out by a TDD (time division duplex) fashion to transmit and to receive a sequence of TDMA frames depicted in FIG. 2, respectively. In this connection, the illustrated TDMA frames may be called a sequence of TDMA/TDD frames.

In FIG. 2, each of the TDMA/TDD frames is divided into first through eighth time slots each of which has a time length or interval of 0.625 milliseconds. This shows that the TDMA/TDD frame has a time length of 5.0 milliseconds. The first through the fourth time slots serve as transmission time slots of the radio station while the fifth through the eighth time slots serve as reception slots of the radio station. In other words, the first through the fourth time slots may be called the transmission time slots of the mobile telephone terminals while the fifth through the eighth time slots may be referred to as the reception time slots of the mobile telephone terminals. From this fact, it is readily understood that each of the mobile telephone terminals is assigned with a single transmission time slot and a single reception time slot.

Now, the mobile telephone terminal 14a (FIG. 1) alone will be described as a representative of the mobile terminals because the other mobile telephone terminals are similar in structure and operation to the mobile terminal 14a. As shown in FIG. 1, the mobile telephone terminal 14a is located in the service area 13a. In this situation, the radio station 11a supplies a radio frame synchrnization signal to the mobile telephone terminal 14a in order to synchronize the mobile telephone terminal 14a with the radio station 11a.

Figure 3:
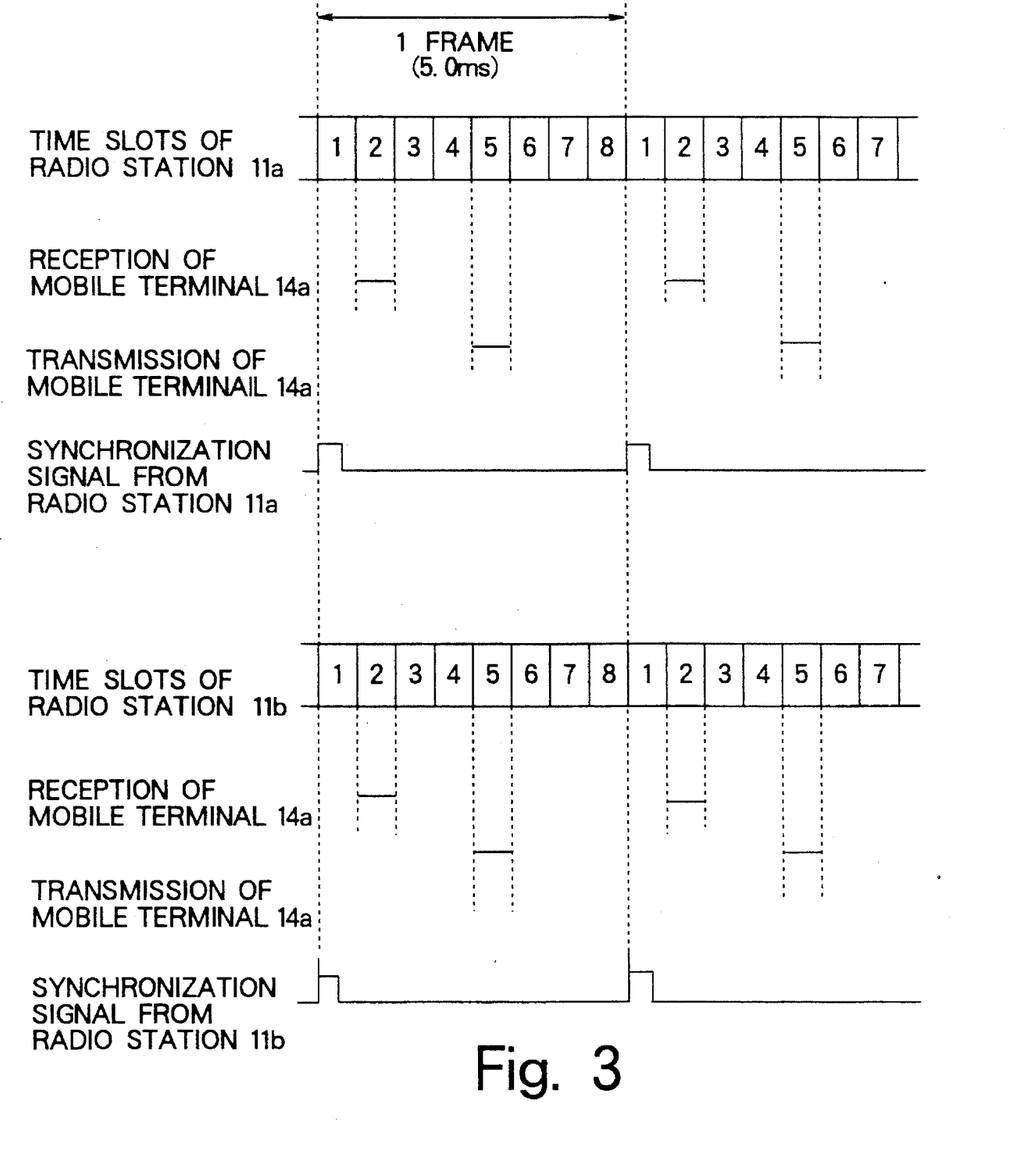
FIG. 3 shows a normal signal format which might appear in a normal state of the digital cordless telephone system illustrated in FIG. 1.

As illustrated along the uppermost row of FIG. 3, it is assumed that the second time slot "2" and the fifth time slot "5" are assigned in every one of the TDMA/TDD frames to the mobile telephone terminal 14a within the service area of the radio station 11a. As long as the mobile telephone terminal 14a stays in the service area 13a, the mobile telephone terminal 14a can communicate with the radio station 11a through the second and the fifth time slots "2" and "5". If the mobile telephone terminal 14a moves from the service area 14a to the service area 14b, the mobile telephone terminal 14a can not communicate with the radio station 11a. Thus, the mobile telephone terminal 14a must change a communication station from the radio station 11a to the radio station 11b.

Figure 4:
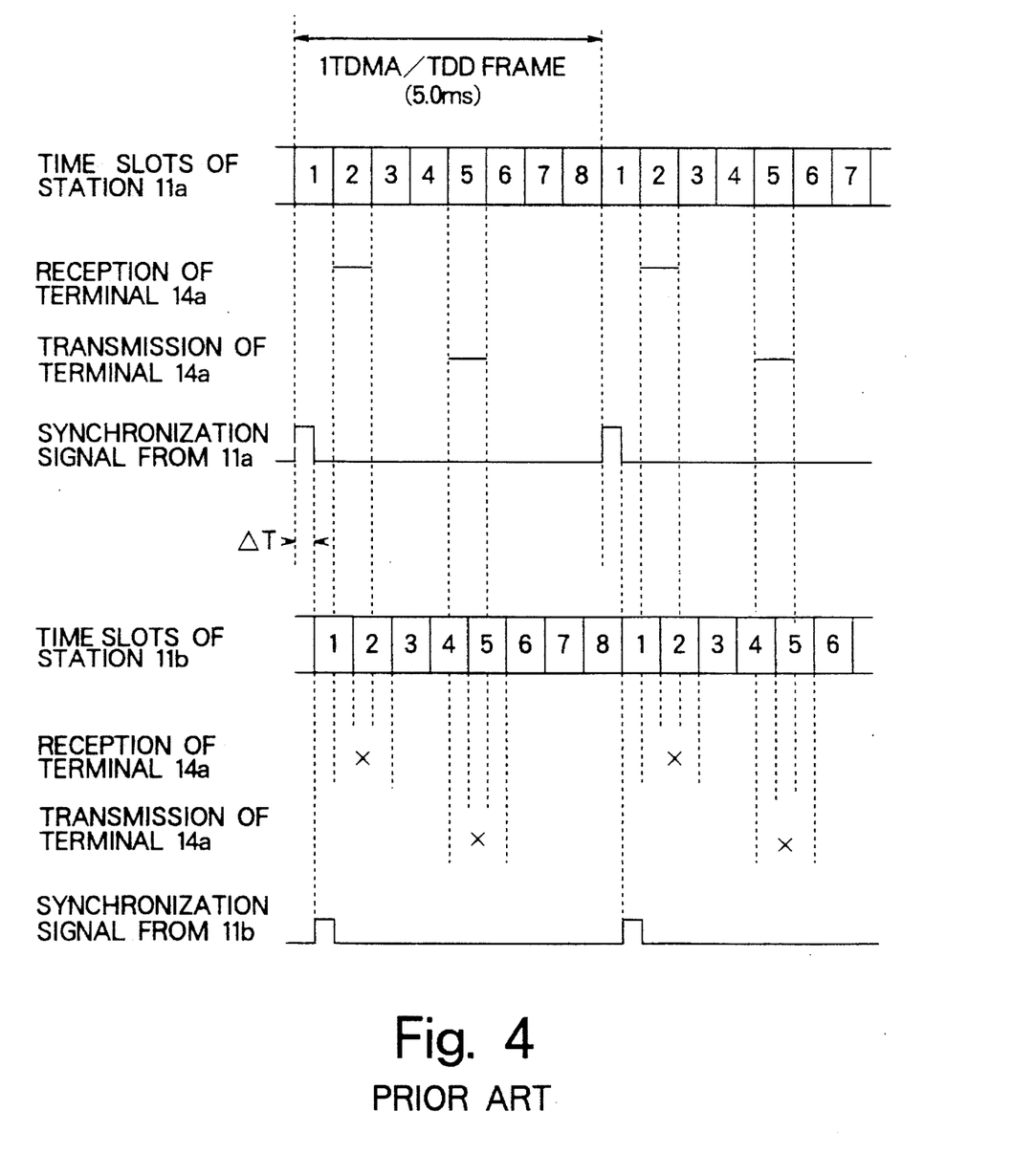
FIG. 4 shows another signal format which might appears in an unusual state of the digital cordless telephone system illustrated in FIG. 1.

If the radio station 11b is operable in synchronism with the radio station 11a as shown in FIG. 3, the same transmission and reception two time slots "2" and "5" can be assigned to the mobile telephone terminal 14a by the radio station 11b also. Therefore, the change of the radio station is smoothly carried out when the synchronization is kept. On the other hand, it is surmised that the radio station 11b does not synchronize with the radio station 11a as shown in FIG. 4 and that there is a delay time ΔT between the radio frame synchronization signals sent from the radio station 11a and the radio station 11b. In this event, the radio station 11b must assign four time slots to the mobile telephone terminal 14a as readily understood from FIG. 4. This deteriorates efficiency of using the time slots in the radio station 11b. Moreover, if the first slot or the fourth slot has been already assigned to another mobile telephone terminal, the mobile telephone terminal 14a in question and the other mobile telephone terminals can not communicate with the radio station 11b through the first and the fourth time slots.

In the conventional digital cordless telephone system, a method has been proposed to synchronize the radio stations 11a, 11b, and 11c with one another and to avoid problems as mentioned above. Specifically, the method delivers a clock signal from an artificial satellite to synchronize the radio stations 11a, 11b, and 11c and so forth with one another. However, the method requires a worldwide network and is therefore very expensive.

Figure 5:
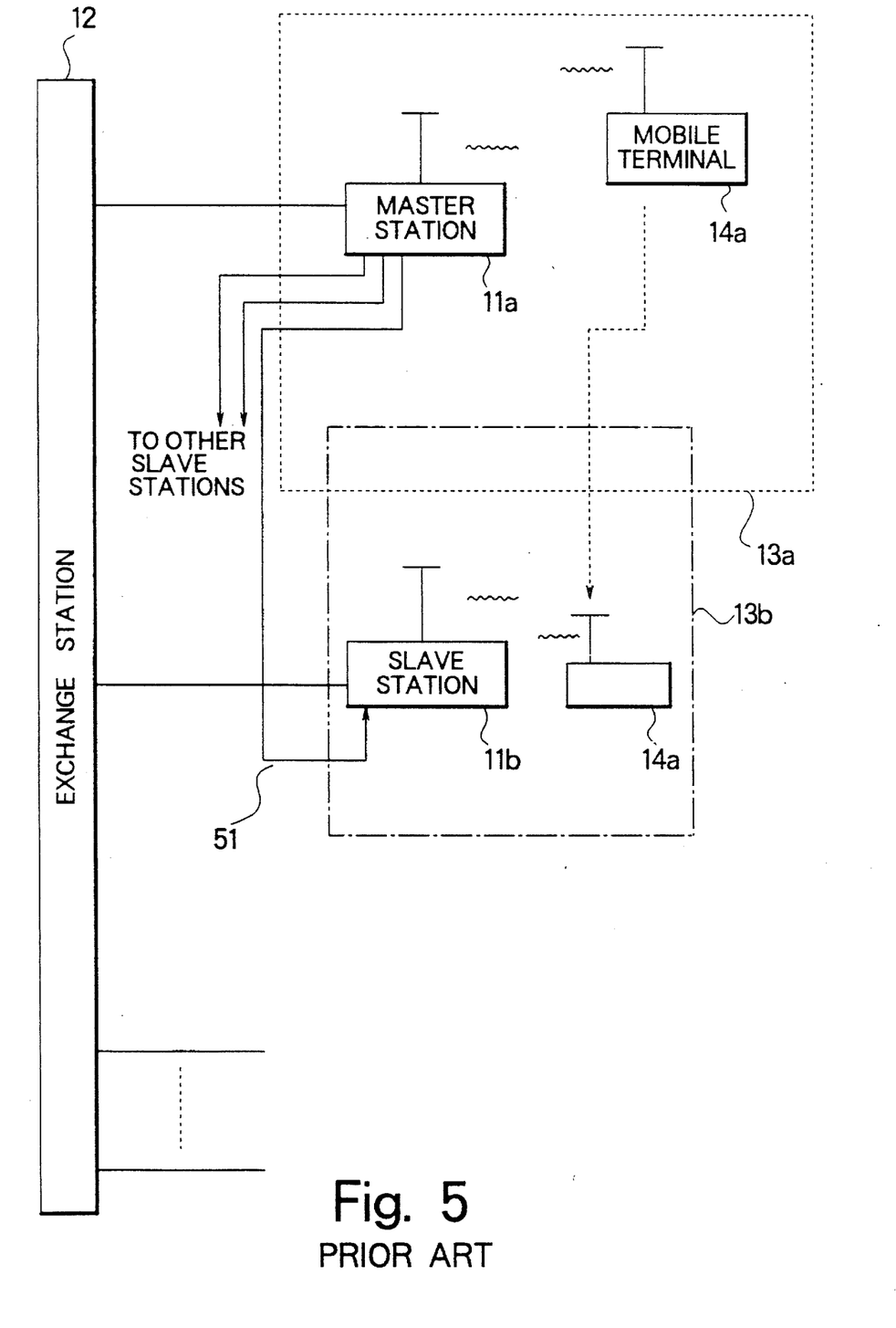
FIG. 5 is a block diagram of a conventional digital cordless telephone system.

Alternatively, in another conventional digital cordless telephone system, one of the radio stations 11a, 11b, 11c, and so on is determined as a master radio station while the remaining radio stations are determined as slave radio stations which are connected to the master station through cables or signal lines. In FIG. 5, it is surmised that the radio station 11a be predetermined as the master station while the radio station 11b is one of the slave stations that is connected to the radio station 11a through the signal line depicted at 51.

With this structure, the master station 11a supplies the radio frame synchronization signal to the slave station 11b through the signal line 51. The radio frame synchronization signal is received by the slave station 11b after a delay time determined in dependency upon a length of the signal line 51 between the stations 11a and 11b. The delay time must be previously measured in order to synchronize the slave station 11b with the master station 11a by the use of the radio frame synchronization signal, as pointed out by the preamble of the instant specification.

Figure 6:
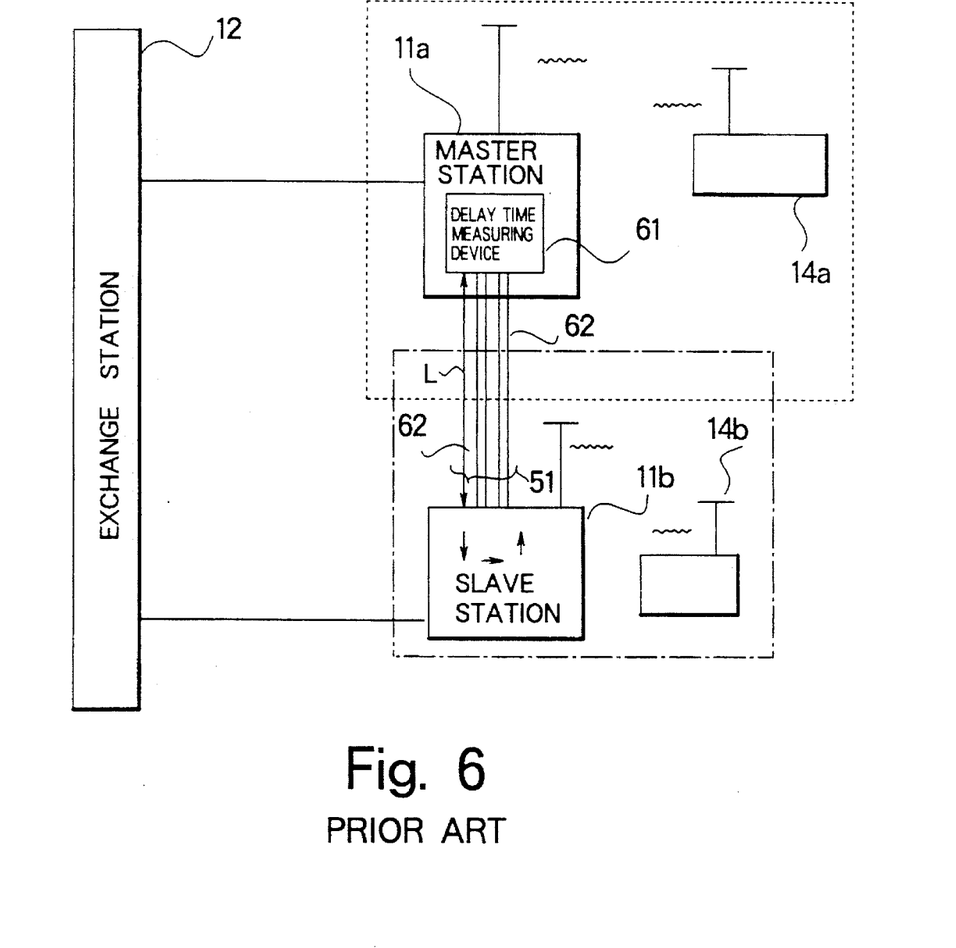
FIG. 6 is a block diagram for use in describing the conventional digital cordless telephone system of FIG. 5 in detail.

In FIG. 6, a delay time measuring device 61 is provided in the master station 11a so as to measure the delay time mentioned above. A pair of cables 62 is connected between the delay time measuring device 61 and the slave station 11b and serves as a part of the signal line 51. The cables 62 are assumed to have the same length equal to L. One of the cables 62 acts as a transmitting cable while another cable acts as a receiving cable.

Figure 7:
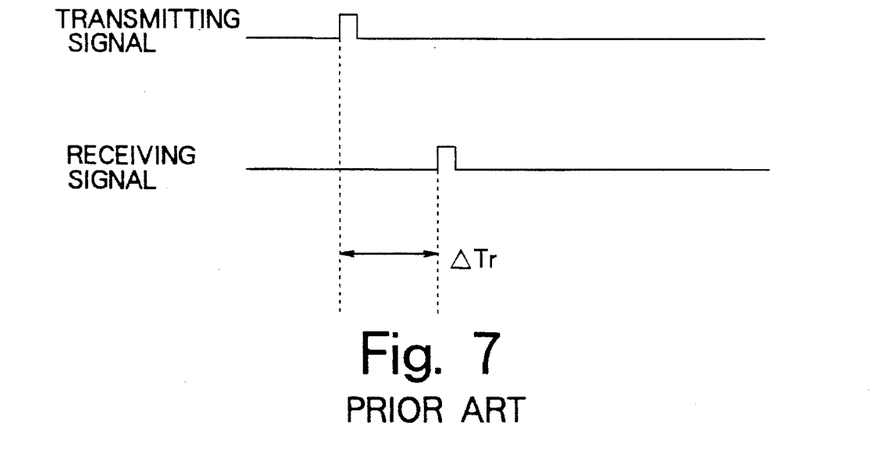
FIG. 7 is a time chart for use in describing an operation of the conventional digital cordless telephone system shown in FIG. 6.

On measuring the delay time, the delay time measuring device 61 transmits a test pulse signal to the slave station 11a through the transmitting cable. The test pulse signal returns back to the delay time measuring device 61 through the receiving cable. The delay time measuring device 61 measures an interval of time Tr between a transmission time instant and a reception time instant in FIG. 7. The interval of time Tr is equal to two times the delay time.

Figure 8:
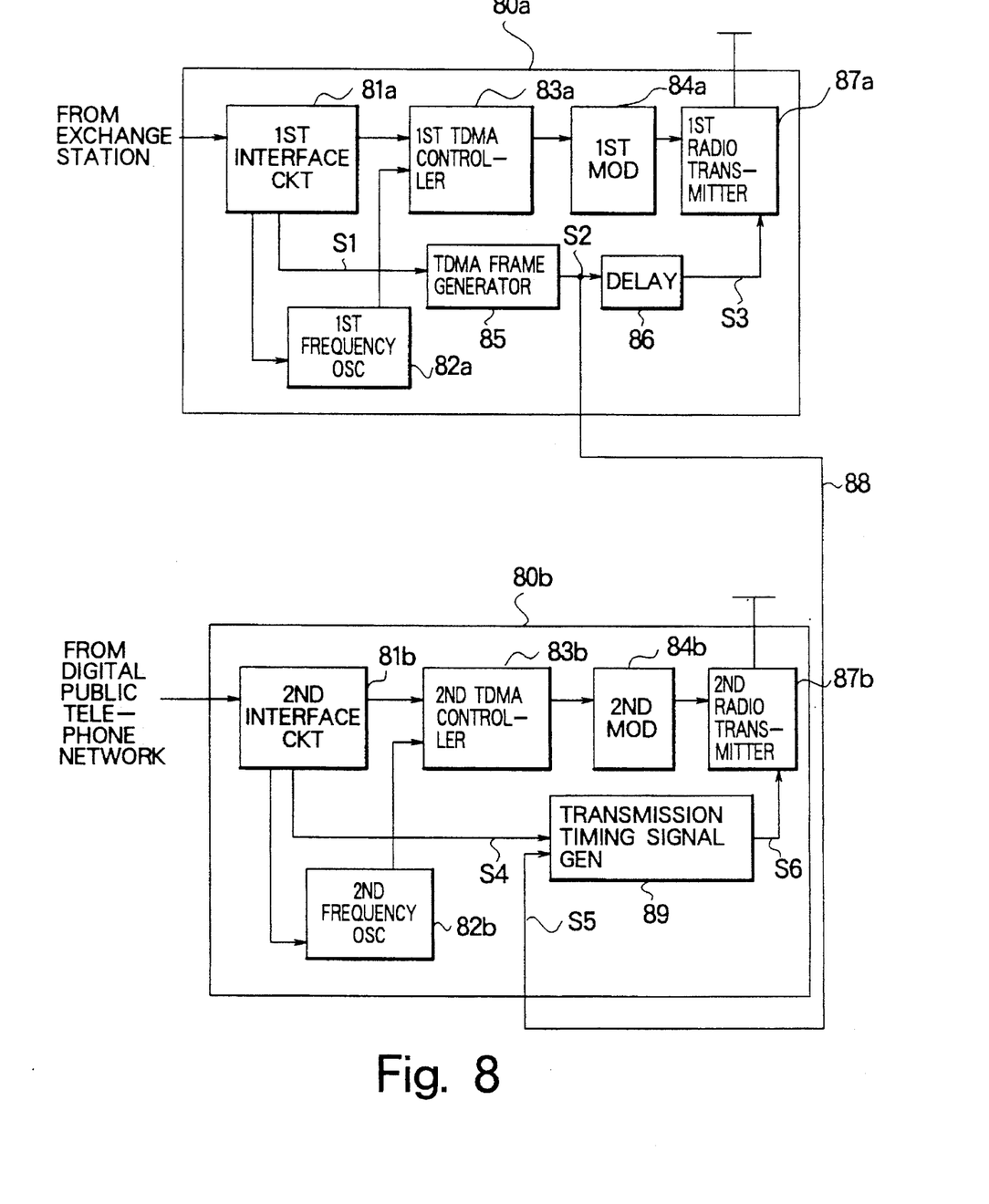
FIG. 8 is a block diagram of a digital cordless telephone system according to a preferred embodiment of this invention.

Referring to FIG. 8, description will proceed to a digital cordless telephone system according to a preferred embodiment of this invention.

The digital cordless telephone system comprises a master radio station (depicted at 80a) which is connected through an exchange station to a public telephone network (not shown). A plurality of slave radio stations are connected to both the master radio station 80a and the exchange station. In FIG. 8, only one of the slave radio stations is illustrated as a representative of the slave stations and is depicted at 80b. The master radio station 80a converts first reception signals received from the exchange station into a first TDMA signal which is divided into a first sequence of frames and which is transmitted from the master radio station 80a in the form of a radio signal.

Likewise, the slave radio station 80b converts second reception signals received from the exchange station into a second TDMA signal which is divided into a second sequence of frames and which is transmitted from the slave radio station in the form of a radio signal. It is to be noted that each of the first and the second reception signals carry a sequence of speech signals in the form of a digital signal.

The master radio station 80a includes a first interface circuit 81a which generates a first network synchronization signal and a first frame synchronization signal S1 in response to the first reception signals. In addition, the first interface 81a extracts the speech signal sequence from the first reception signals and produces a sequence of first digital speech signals which has a bit rate of 64 kilobits. The first frame synchronization signal S1 is produced in synchronism with the first reception signal and has a first frame period. In the illustrated example, the first frame period is equal to twice a period of the first network synchronization signal. Preferably, the first interface circuit 81a may be implemented by µPD98201 manufactured and sold by NEC.

A first variable frequency oscillator 82a is connected to the first interface circuit 81a and is supplied with the first network synchronization signal to produce a first clock signal for bit synchronization. A first TDMA controller 83a is connected to both the first interface circuit 81a and the first variable frequency oscillator 82a and controls the first digital speech signals in accordance with the first clock signal to produce the first TDMA signal. A first modulator 84a is connected to the first TDMA controller 83a and modulates the first TDMA signal into a first modulated TDMA signal.

Supplied with the first frame synchronization signal S1, a TDMA frame synchronization signal generator 85 is connected to the first interface circuit 81a and generates a TDMA frame synchronization signal S2 on the basis of the first frame synchronization signal S1. The TDMA frame synchronization signal S2 is sent to a delay circuit 86 which is connected to the TDMA frame synchronization signal generator 85 and which delays the TDMA frame synchronization signal S2 by a time interval which is equal to one frame defined by the first frame synchronization signal S1. As a result, the delay circuit 86 supplies a first transmitter with a delayed TDMA frame synchronization signal S3 delayed by a single frame.

The first transmitter 87a is connected to both the first modulator 84a and the delay circuit 86 and supplied with the delayed TDMA frame synchronization signal S3 and the first modulated TDMA signal to produce a first modulated TDMA signal. The first modulated TDMA signal is sent from the TDMA frame synchronization signal generator 85 through a TDMA frame synchronization signal supplying line 88 to an antenna in the form of the radio signal.

It is to be noted that the TDMA frame synchronization signal S2 is also delivered to the slave radio station 80b.

Further referring to FIG. 8, the slave radio station 80b is similar in operation to the master station 80a except that the first TDMA frame synchronization signal S2 is given to the slave radio station 80b. Specifically, the slave radio station 80b is supplied with the second reception signals which carry a sequence of second speech signals in the form of digital signals. The illustrated slave radio station 80b includes a second interface circuit 81b which generates a second network synchronization signal and a second frame synchronization signal in response to the second reception signals and which derives the second digital speech signals from the second reception signals. Like the first interface circuit 81a, the second interface circuit 81b may be preferably structured by µPD98201.

The second frame synchronization signal S4 appears in synchronism with the second reception signals and has a second frame period. The second frame period is assumed to be equal to twice a period of the second network synchronization signal. The second frame period may be equal to the first frame period and is assumed to be 250 microseconds in the illustrated example.

A second variable frequency oscillator 82b receives the second network synchronization signal to supply a second TDMA controller 83b with a second clock signal for bit synchronization.

The second TDMA controller 83b is also supplied from the second interface circuit 81b with the second digital speech signals to control the second digital speech signals in accordance with the second clock signal and to produce the second TDMA signal which is divided into a sequence of second TDMA frames. Each of the second TDMA frames has a second TDMA period of 5 milliseconds and is equal to the first TDMA period of the first TDMA frame. A second modulator 84b is connected to the second TDMA controller 83b and modulates the second TDMA signal into a second modulated TDMA signal in a known manner.

A transmission timing signal generator 89 is connected to the second interface circuit 81a and is also connected to the master radio station 80a through the TDMA frame synchronization signal supplying line 88. This shows that the transmission timing signal generator 89 is supplied with the TDMA frame synchronization signal S2 and the second frame synchronization signal S4 from the master radio station 80a and the second interface circuit 81b, respectively. Consequently, the transmission timing signal generator 89 times the second frame synchronization signal S4 by the TDMA frame synchronization signal S2 and produces a second delayed TDMA frame synchronization signal S6 in a manner to be described later. The second delayed TDMA frame synchronization signal is sent to a second radio transmitter 87b together with the modulated TDMA signal. As a result, the second radio transmitter 87b transmits through an antenna (unnumbered) the radio signal synchronized with the TDMA frame synchronization signal given from the master radio station 80a.

Figure 9:
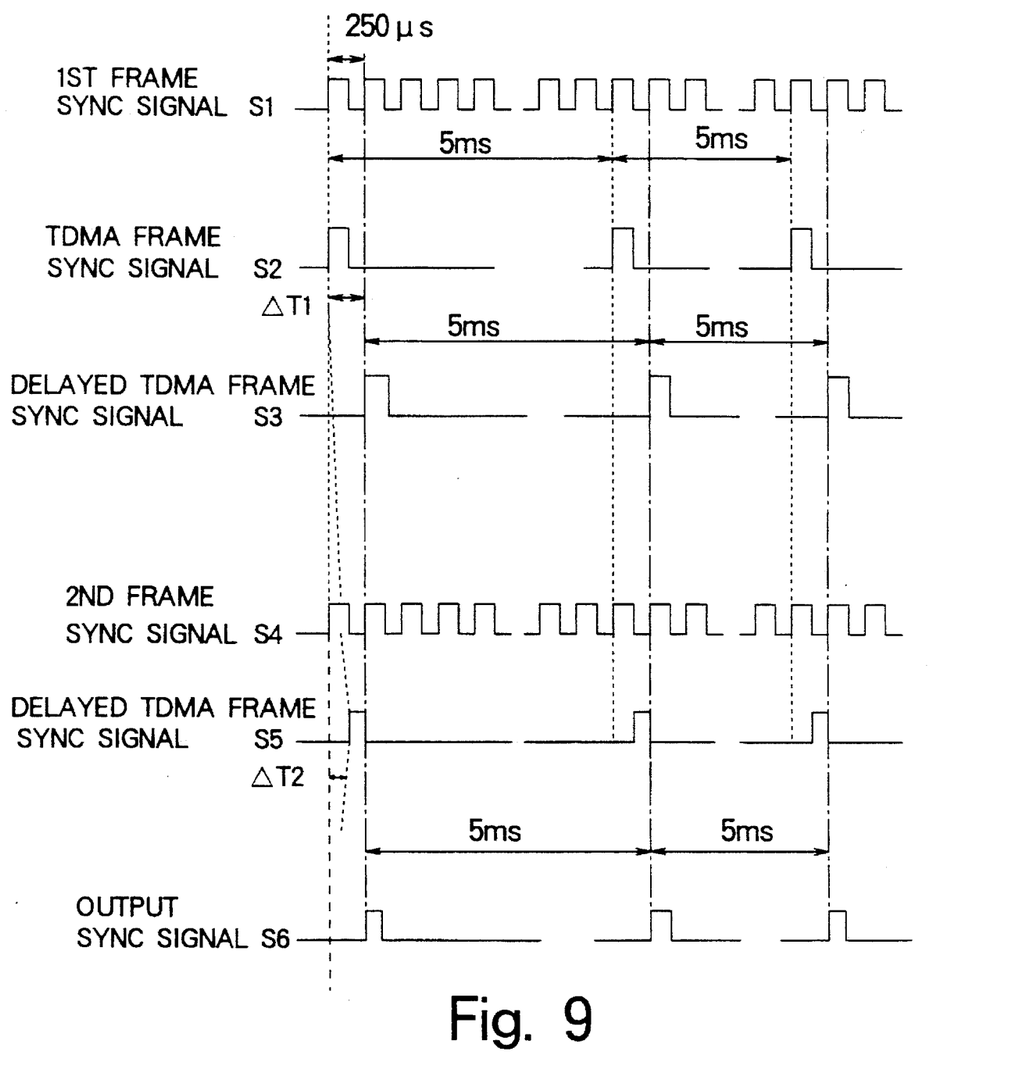
FIG. 9 shows a time chart for use in describing an operation of the digital cordless telephone system illustrated in FIG. 8.

Referring to FIGS. 8 and 9 in addition to FIG. 1, an operation of the digital cordless system will be described in detail in the following.

The first interface circuit 81a is practically connected to the exchange station through a pair of digital public lines each of which is assigned with a pair of so-called B-channels, namely, data channels, although a single line alone is illustrated in FIG. 8. Each of the public lines is given an input data signal at a bit rate of 192 kbits from the exchange station to the first interface circuit 81a. The input data signal includes the two data channels to which two digital speech signals of 64 kbits are allocated, respectively.

As a result, the first interface circuit 81a also receives the input data signals in pair from the exchange station through the two public lines. The input data signals are synchronized with each other. Responsive to each of the input data signals, the first interface circuit 81a produces the first network synchronization signal and the first frame synchronization signal S1 which have repetition periods of 125 microseconds and 250 microseconds, respectively. The first interface circuit 81a derives two sequences of the digital speech signals from each of the input data signals. Thus, the first interface circuit 81a serves to extract four lines of the digital speech signals in total.

The first variable frequency oscillator 82a receives the network synchronization signal to supply the first TDMA controller 83a with the first clock signal which has a repetition frequency of 384 kbit/second.

Thus, the first TDMA controller 83a is given the four digital speech signals and the first bit synchronization clock signal. In the illustrated example, the TDMA controller 83a includes four ADPCM (adaptive differential pulse code modulation) modulators (not shown) to modulate the four digital speech signals into modulated speech signals, respectively. Such ADPCM modulators are well known in the art and will not be described any longer. In addition, the TDMA controller 83a also comprises four random access memories each of which is known in the art and which is connected to each of the four ADPCM modulators. The four ADPCM modulators supply the four random access memories with the modulated speech signals at the bit rates of 32 kbits, respectively. Consequently, each of the four random access memories memorizes each modulated speech signal for a time interval of 5 milliseconds. In other words, each of the four random access memories is loaded with each modulated speech signal of 160 bits.

The first TDMA controller 83a successively reads the modulated speech signals out of the four random access memories at the bit rate of 160 bits in response to the first bit synchronization clock signal. In the first TDMA controller 83a, additional data signals are added to each of the modulated speech signals read out of the four random access memories to be rendered into an internal data signal which lasts for 625 microseconds. Thereafter, four of the internal data signals are multiplexed into an internal TDMA signal which lasts for 2.5 milliseconds and which is divided into the first through the fourth time slots, as shown in FIG. 2. Thus, the first TDMA controller 83a forms the first TDMA signal which lasts for 5 milliseconds and which is divided into the first through the eighth time slots, as illustrated in FIG. 2. Such formation of a TDMA frame can be readily carried out by measuring a time in a usual manner.

The first modulator 84a modulates the first TDMA signal into the modulated TDMA signal.

On the other hand, the TDMA frame synchronization signal generator 85 generates the TDMA frame synchronization signal S2 in response to the frame synchronization signal S1. As mentioned before, the TDMA frame synchronization signal S2 has the repetition period of 5 milliseconds and is delayed by the delay circuit 86 for a predetermined time T1. The predetermined time T1 may be equal to the repetition period of the frame synchronization signal S1. The first transmitter 87a produces the modulated TDMA signal in synchronism with the delayed TDMA frame synchronization signal S3 as the radio signal.

As illustrated in FIG. 8, the TDMA frame synchronization signal S2 is sent to the slave radio station 80b through the TDMA frame synchronization signal supplying line 88.

Figure 10:
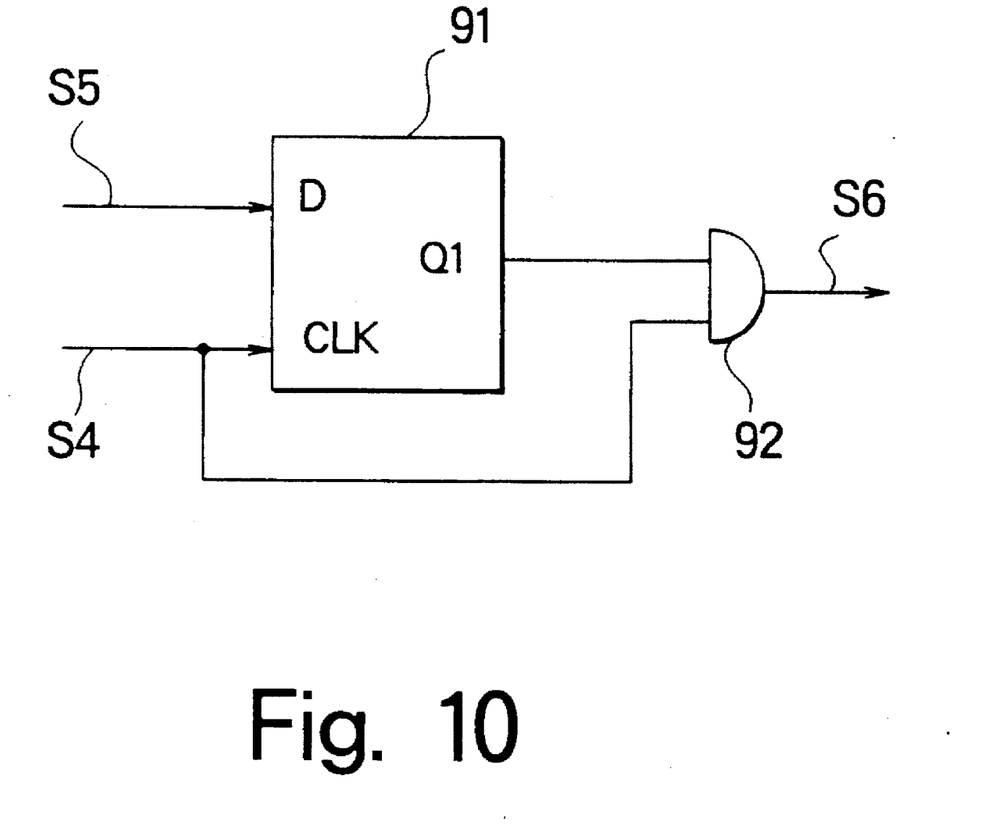
FIG. 10 is a block diagram of a transmission timing signal generator illustrated in FIG. 8.

Referring to FIG. 10 afresh and FIGS. 8 and 9, the slave radio station 80b is operated in a manner similar to the master radio station 80a except that the TDMA frame synchronization signal S2 is delayed through the TDMA frame synchronization signal supplying line 88 and is given as a delayed TDMA frame synchronization signal S5 to the transmission timing signal generator 89 of the slave radio station 80b.

Like in the master radio station 80a, the second interface circuit 81b is supplied from the exchange station 12 with the input digital signals to extract the digital speech signals from the input digital signals and to send them to the second TDMA controller 83b. The second TDMA controller 83b forms the TDMA signal which is divided into the first through the eighth time slots, as illustrated in FIG. 2.

Furthermore, the second interface circuit 81b extracts, from the input digital signals, the second network synchronization signal and the second frame synchronization signal S4 which are delivered to the second frequency circuit 82b and the transmission timing signal generator 89, respectively. The second frequency generator 82b supplies the second TDMA controller 83b with the second clock pulse for bit synchronization to make the second TDMA controller 83b generate, in timed relation to the second clock pulse, the TDMA signal which is divided into the TDMA frames.

Herein, it should be understood that the second frame synchronization signal S4 is completely synchronized with the first frame synchronization signal S1 of the master radio station 80a because both the first and the second frame synchronization signals S1 and S4 are generated by the same exchange station 12. However, the delayed TDMA frame synchronization signal is shifted in phase relative to the first and the second frame synchronization signals S1 and S4 in dependency upon the delay time determined by the length of the TDMA frame synchronization signal supplying line 88.

Taking the above into consideration, both the second frame synchronization signal S4 and the delayed TDMA frame synchronization signal S5 are supplied to the transmission timing signal circuit 89.

As shown in FIG. 10, the transmission timing signal circuit 89 is practically implemented by a delay flip-flop 91 and an AND gate 92. The second frame synchronization signal S4 is given to the delay flip-flop 91 as a clock signal while the delayed TDMA frame synchronization signal S5 is given as a delay signal to the delay flip-flop 91. With this structure, the delay flip-flop 91 produces an output signal Q of a high level when the second frame synchronization signal 84 appears in the presence of the delayed TDMA synchronization dignal S5, as known in the art. This means that the output signal Q is synchronized with the second frame synchronization signal S4 and that a phase difference between the second frame synchronization signal S4 and the delayed TDMA frame synchronization signal S5 is absorbed by the delay flip-flop 91. The output signal Q of the high level lasts until reception of a following TDMA frame sychronization signal S4. Under the circumstances, the output signal Q is sent to the AND gate 92 together with the second frame synchronization signal S4 to produce and output synchronization signal S6. Inasmuch as the output sychronization signal S6 is timed by the second frame synchronization signal S4 and delayed by a single frame, the output synchronization signal S6 is completely synchronized with the delayed TDMA frame sychronization signal S3 produced in the master radio station 80a, as illustrated in FIG. 9.

From this fact, it is readily understood that the synchronization of the TDMA frames is established between the master and the slave radio stations 80a and 80b.

Although the above description has been restricted to the digital cordless telephone system which comprises the master radio station and the single slave radio station, it is needless to say that a plurality of slave radio stations may be included in the digital cordless telephone system because similar operation can be executed among the master radio station and the other slave radio stations.

While this invention has thus far been described in conjunction with a preferred embodiment thereof, it will be readily possible for those skilled in the art to put this invention into practice in various other manners. For example, more than the single frame may be delayed in the delay circuit 86 in the master radio station as long as more than the single frame can be delayed in the transmission timing signal generator 89 of the slave radio station 80b. Moreover, comparison may be made either between the TDMA frame synchronization signals of the master and the slave radio stations or between the frame synchronizations of the master and the slave radio stations to detect a phase difference between the master and the slave radio stations. In addition, the delay circuit 86 in the master radio station 80a may be replaced by a combination of a delay circuit and a phase detector.

What is claimed is:

1. A digital cordless telephone system comparising a master radio station connected through an exchange to a public telephone network and a slave radio station which is connected to said master radio station through a transmission line and which is also connected to said exchange station, said master radio station being for converting a first reception signal received from said exchange station into a first TDMA signal which is transmitted in the form of a first radio signal from said master radio station while said slave radio station is for converting a second reception signal received from said exchange station into a second TDMA signal which is transmitted in the form of a second radio signal from said slave radio station, the first and the second reception signals including first and second frame synchronization signals, respectively, while the first and the second TDMA signals include first and second TDMA frame sychronization signals produced from the first and the secondd frame synchronization signals, respectively;

said master radio station including:

first interface means connected to said exchange station for generating said first frame synchronization signal which is derived from said first reception signal and which has a first frame period;

TDMA frame synchronization signal generating means connected to said first interface means for generating said first TDMA frame synchronization signal in response to said first frame synchronization signal;

TDMA signal supplying means connected to said TDMA frame synchronization signal generating means for supplying said first TDMA frame synchronization signal to said slave radio station through said transmission line; and delay means connected to said TDMA frame synchronization signal generating means for delaying said first TDMA frame synchronization signal by a delay time which is equal to said first frame period to define a first transmission time instant of said first TDMA signal;

said slave radio station including:

second interface means connected to said exchange station for generating the second frame synchronization signal which is derived from said second reception signal and which has a second frame period equal to said first frame period; and transmission timing adjusting means connected to said TDMA signal supplying means through said transmission line and said second interface means for adjusting said second TDMA frame sychronization signal in response to said second frame synchronization signal with reference to the first TDMA frame synchronization signal received through the transmission line to define a second transmission time instant of said second TDMA signal, said second transmission time instant being coincident with said first transmission time instant.

2. A digital cordless telephone system as claimed in claim 1, wherein said transmission timing adjusting means comprises:

timing control means supplied with said second frame sychronization signal and the first TDMA frame sychronization signal for timing said second frame sychronization signal with reference to said first TDMA frame sychronization signal to produce an output signal which is matched with said first TDMA frame sychronization signal; and signal producing means supplied with said output signal and the first TDMA frame sychronization signal for producing the second TDMA frame sychronization signal which has the second transmission time instant coincident with the first transmission time instant.

3. A master radio station responding to a reception signal sent from an exchange station to produce a TDMA signal in the form of a radio signal and a synchronization timing control signal through a transmission line, said reception signal including a frame sychronization signal having a frame period and a data signal while said TDMA signal includes a TDMA frame synchronization signal based on said frame synchronization signal, said master radio station comprising:

interface means supplied with said reception signal for extracting the frame synchronization signal and the data signal from said reception signal as an extracted frame synchronization signal and an extracted data signal, respectively;

TDMA frame reproducing means supplied with said extracted frame synchronization signal for reproducing the TDMA frame synchronization signal as a reproduced TDMA frame synchronization signal on the basis of said extracted frame synchronization signal;

signal supplying means for supplying said reproducued TDMA frame synchronization signal to said transmission line as said synchronization timing control signal;

delay means supplied with said synchronization timing control signal for delaying said synchronization timing control signal by a single frame period into a delayed synchronization timing control signal; and TDMA signal producing means supplied with said extracted data signal and said delayed synchronization timing control signal for producing, as the radio signal, the TDMA signal synchronized with said delayed synchronization timing control signal.

4. A slave radio station supplied with a reception signal and a synchronization timing control signal to produce a TDMA signal in the form of a radio signal, said reception signal including a frame synchronization signal having a frame period and a data signal while said TDMA signal includes a TDMA frame synchronization signal based on said frame synchronization signal, said slave radio station comprising:

interface means supplied with said reception signal for extracting the frame synchronization signal and the data signal from said reception signal as an extracted frame synchronization signal and an extracted data signal, respectively;

timing control signal generating means supplied with said extracted frame synchronization signal and said synchronization timing control signal for generating an output timing control signal determined by both said extracted frame synchronization signal and said synchronization timing control signal; and TDMA signal producing means supplied with said extracted data signal and said output timing control signal for producing the TDMA signal as the radio signal in accordance with said output timing control signal.

5. A slave radio station as claimed in claim 4, wherein said timing control signal generating means comprises:

a delay flip-flop supplied with said extracted frame synchronization signal and said synchronization timing control signal for generating an output signal timed by said extracted frame synchronization signal; and an AND gate for carrying out an AND operation between said output signal and said extracted frame synchronization signal to produce said output timing control signal.

6. A slave radio station as claimed in claim 5, wherein the output timing control signal appears at a time instant delayed by a single frame period.

* * * * *

UNITED STATES PATENT AND TRADEMARK OFFICE
CERTIFICATE OF CORRECTION

PATENT NO. : 5,473,668
DATED : Dec. 5, 1995
INVENTOR(S) : Toru Nakahara

It is certified that error appears in the above-indentified patent and that said Letters Patent is hereby corrected as shown below:

Column 8, line 38, delete "84" and insert --S4--.

Signed and Sealed this

Twenty-third Day of July, 1996

Attest:

BRUCE LEHMAN

*Attesting Officer*     *Commissioner of Patents and Trademarks*